United States Patent [19]

McPherson et al.

[11] Patent Number: 5,747,397
[45] Date of Patent: May 5, 1998

[54] OPTICAL GLASS

[75] Inventors: Donald M. McPherson, Oakland; Steven C. Murray, Santa Cruz, both of Calif.

[73] Assignee: Bay Glass Research, Berkeley, Calif.

[21] Appl. No.: 743,058

[22] Filed: Nov. 4, 1996

[51] Int. Cl.$^6$ ................................................. C03C 3/15
[52] U.S. Cl. ........................... 501/51; 501/50; 501/52; 501/78; 501/900
[58] Field of Search ................................. 501/50, 51, 52, 501/78, 900

[56] References Cited

U.S. PATENT DOCUMENTS

| | | | |
|---|---|---|---|
| 3,935,020 | 1/1976 | Deeg et al. | 501/51 |
| 3,958,999 | 5/1976 | Izumitani et al. | 501/51 |
| 3,960,754 | 6/1976 | Woodcock | 501/50 |
| 3,971,723 | 7/1976 | Tajima et al. | 252/62.51 |
| 4,168,176 | 9/1979 | Hirota | 501/78 |
| 4,226,627 | 10/1980 | Inoue et al. | 501/900 |
| 4,288,250 | 9/1981 | Yamashita | 501/78 |
| 4,481,299 | 11/1984 | Tajima | 501/73 |
| 4,495,298 | 1/1985 | Yamagishi et al. | 501/55 |
| 4,521,524 | 6/1985 | Yamashita | 501/64 |
| 4,726,652 | 2/1988 | Tamija et al. | 350/96.34 |
| 5,288,669 | 2/1994 | Grateau et al. | 501/78 |
| 5,413,971 | 5/1995 | McPherson | 501/78 |
| 5,491,767 | 2/1996 | McPherson et al. | 385/123 |

OTHER PUBLICATIONS

"*Effect of $R^{3+}$ Ions on the Structure and Properties of Lanthanum Borate Glasses*", I.N. Chakraborty and D.E. Day, Journal of the American Ceramic Society, Dec. 1985, vol. 68, No. 12, pp. 641–645.

"*Elastic Moduli and Refractive Indices of Aluminosilicate Glasses Containing $Y_2O_3$, $La_2O_3$, and $TiO_2$,*" Journal of the American Ceramic Society, May–Jun. 1978, vol. 61, No. 5–6, pp. 247–249.

*Primary Examiner*—Mark L. Bell
*Assistant Examiner*—Louis M. Troilo
*Attorney, Agent, or Firm*—Steven F. Caserza; Flehr Hohbach Test Albritton & Herbert, LLP

[57] ABSTRACT

High rare-earth content glasses ($Ln_2O_3 \geq 20$ mol %) have applications as high optical density wavelength-selective filters, faraday rotators, scintillation glasses and high index glasses. New glasses are formed by adding $TiO_2$ to the system $SiO_2$—$B_2O_3$—$Al_2O_3$—$Ln_2O_3$. These glasses have improved optical properties, extended glass formation range and have superior resistance to devitrification. In some embodiments $TiO_2$ can fully replace the $Al_2O_3$. In additional embodiments, $SiO_2$ can be completely removed from the glass.

14 Claims, No Drawings

OPTICAL GLASS

TECHNICAL FIELD

The present invention relates to high rare-earth content glasses with improved stability against devitrification. In particular, the addition of $TiO_2$ to the system $SiO_2$—$B_2O_3$—$Al_2O_3$—$Ln_2O_3$ reduces the liquids temperature of the glass thus greatly facilitating the forming of high rare-earth concentration optical quality glass. Also, this invention relates to novel glasses with improved optical properties formed by adding $TiO_2$ to the system $SiO_2$—$B_2O_3$—$Al_2O_3$—$Ln_2O_3$. Additionally, the invention relates to stable, very high rare-earth glasses, with over 42 mol % rare-earth oxide, stabilized against devitrification by adding $TiO_2$ to the system $SiO_2$—$B_2O_3$—$Al_2O_3$—$Ln_2O_3$.

DESCRIPTION OF THE PRIOR ART

Many optical elements exhibit improved optical performance at high rare-earth content. The incorporation of rare-earths into a glass host at levels above about 20 mol % oxide results in a glass with reduced stability against devitrification, such that with increasing rare-earth content, (above about 30 mol % oxide), formation of high optical quality glass becomes quite difficult.

In U.S. Pat. No. 5,413,917, rare-earth oxides, $Ln_2O_3$, were incorporated up to 39 mol % into a suitable glass host, consisting essentially of, in mol %, 19–31% $SiO_2$, 19–31% $B_2O_3$, 10–25% $Al_2O_3$, 0–10% $ZrO_2$, 0–10% $Y_2O_3$. With the rare-earth oxide, $L_nO_3$, being $Nd_2O_3$, $Er_2O_3$, $Dy_2O_3$, $Sm_2O_3$, $Ho_3O_3$, or combination thereof, the greatest stability against devitrification was for glass hosts wherein the molar ratio of $SiO_2$ to $B_2O_3$ were near unity. This finding was previously reported for $Tb_2O_3$ in a similar glass host in U.S. Pat. No. 3,971,723.

Binary rare-earth borate glasses are prone to phase-separation. For sufficiently high field strength rare-earth ions, ($Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$), no glass formation is possible. The incorporation of $Al_2O_3$ stabilizes the glass against devitrification and phase separation. Binary rare-earth silicate glasses are also prone to phase separation, which again can be remedied by adding $Al_2O_3$ and $Y_2O_3$.

In $Ln_2O_3$—$Al_2O_3$—$B_2O_3$ glasses, the structure is reported to be $[BO_3]$ and $[BO_4]^-$ units in a 2:1 ratio forming long chains, $(B_3O_6)_4$, with the rare-earth ion situated between the chains in 10-cornered polyhedra. In this structural model 4 $[BO_3]$ units are bonded to each $[BO_4]$ unit, the inter-chain linkage occurring at the $[BO_4]$-site. The alumina ion replaces the boron ion at the tetrahedrally coordinated site forming $[AlO_4]$-units, still bonded to 4 $[BO_3]$ units. The replacement of boron with the larger alumina ion increases the separation distance between neighboring $[BO_3]$ chains, keeping the structure from collapsing in upon itself, and greatly increasing the stability against devitrification and phase separation. This allows an extension of the range of stable glass formation to higher rare-earth content and to higher field strength rare-earth ions.

In $Ln_2O_3$—$Al_2O_3$—$SiO_2$ glasses the structure is reported to be a three dimensional random network of $SiO_4$ units linked to $Al^{3+}$ ions which are distributed as $[AlO_4]^-$, $[AlO_5]^{-2}$ and $[AlO_6]^{-3}$ structural units. The rare-earth ion, $Ln^{3+}$, is associated with either an $[AlO_6]^{-3}$ unit or associated with both an $[AlO_4]^-$ and an $[AlO_5]^{-2}$ structural unit.

Components can be added to these glasses that either lower the liquids temperature, increase the viscosity at the liquidus temperature, or both. A lower liquidus temperature favors glass formation since a smaller temperature interval is involved in cooling from the fluid melt to a rigid state at the glass transition temperature, $T_g$. A higher viscosity at the liquidus temperature creates a free-energy barrier to structural rearrangement within the glass, inhibiting the lower free energy crystalline state from forming.

By melting high rare-earth content glasses based on an equimolar concentration of $SiO_2$ and $B_2O_3$, the first principal is being employed, namely lowering the liquidus temperature by choosing eutectic melts. Components that restore continuity to the structure by eliminating non-bridging oxygen, such as $Al_2O_3$, can be added to increase the viscosity at the liquidus temperature, thus utilizing the second stabilizing principal. There are limits to how much $Al_2O_3$ can be added, because as the concentration $Al_2O_3$ increases, at fixed $Ln_2O_3$ concentration, the concentration of glass formers, namely $SiO_2$ and $B_2O_3$, must be decreased. Consequently the glass stability decrease.

SUMMARY

This invention relates to two separate embodiments, a family of novel glasses with superior optical properties and a sub-class of this family which also exhibits excellent resistance to devitrification.

We have found that a glass host suitable for high rare-earth concentration can be formulated with superior resistance to devitrification over the prior art by incorporation of $TiO_2$ up to approximately 30 mol %. This incorporation allows stable glass formation to occur over the wide composition ranges stated below, (expressed in terms of mole percent):

| | | | |
|---|---|---|---|
| $SiO_2$ | 0–40 | $TiO_2$ | 5–30 |
| $B_2O_3$ | 0–40 | $Al_2O_3$ | 0–30 |
| $GeO_2$ | 0–25 | $Y_2O_3$ | 0–25 |
| $P_2O_5$ | 0–10 | $ZrO_2$ | 0–10 |
| $Ln_2O_3$ | 20–42 | $Ga_2O_3$ | 0–20 |
| | | $WO_3$ | 0–10 |
| | | $MoO_3$ | 0–9 |
| | | $ZnO$ | 0–8 |
| | | $SnO_2$ | 0–7 |
| | | $Nb_2O_5$ | 0–6 |
| | | $Ta_2O_5$ | 0–5 | with the additional conditions set out below, (in mole percent):

| | |
|---|---|
| $SiO_2 + B_2O_3 + GeO_2 + P_2O_5$ | $\geq 30$ |
| $Ln_2O_3 + Y_2O_3$ | 20–42 |
| $TiO_2 + Al_2O_3 + ZrO_2 + ZnO + SnO_2 + Ga_2O_3 +$ | 10–37 |
| $Nb_2O_5 + Ta_2O_5\ WO_3 + MoO_3$ | |
| $TiO_2 + Al_2O_3$ | 10–36 |
| $TiO_2 + SiO_2$ ($GeO_2 = 0$) | 15–55 |
| $TiO_2 + SiO_2 + GeO_2$ | 29–40 |
| $TiO_2 + SiO_2 + GeO_2 + B_2O_3$ | 48–66 |

DESCRIPTION OF SPECIFIC EMBODIMENTS

In accordance with the teachings of this invention, a novel glass is taught in which the measured glass transition temperature, thermal expansion coefficient and density do not vary significantly as $Al_2O_3$ is replaced by $TiO_2$ in the B—Si—Al—Ln glasses. We thus believe that $Ti^{4+}$ probably replaces $Al^{3+}$ as the tetrahedrally coordinated $[TiO4]$. The refractive index is more strongly affected by this replacement. By noting the fact that glasses can be formed in the $B_2O_3$—$SiO_2$—$Al_2O_3$—$TiO_2$—$Ln_2O_3$ system at high $Ln_2O_3$ without $Al_2O_3$ or $SiO_2$, we have determined that $TiO_2$ can effectively replace either of these structurally.

TABLE I

A series of stable $B_2O_3.TiO_2.Nd_2O_3$ glasses (compositions given in mol %).

| Oxide | ND-T32 | ND-T33 | ND-T34 | ND-T135 | ND-T136 | ND-T137 | ND-T138 |
|---|---|---|---|---|---|---|---|
| $TiO_2$ | 22.22 | 25.00 | 27.27 | 27.59 | 21.43 | 17.38 | 12.50 |
| $B_2O_3$ | 55.56 | 50.00 | 45.45 | 48.28 | 50.00 | 52.17 | 62.50 |
| $Nd_2O_3$ | 22.22 | 25.00 | 27.27 | 24.14 | 28.57 | 30.43 | 25.00 |

Since we found that glasses cannot be formed in the $B_2O_3.1'SiO_2$—$Al_2O_3$—$TiO_2$—$Ln_2O_3$ system at high $Ln_2O_3$ concentration without $B_2O_3$, we regard this family of glasses as borate glasses with $SiO_2$, $Al_2O_3$ and $TiO_2$ modifying the structure by replacing $[BO_4]^-$ units. The improved stability is a consequence of improved structural stability and lowered liquidus temperature.

R=reflectance,
$\bar{a}$=a linear absorption coefficient,
c=concentration,
x=thickness.

High rare-earth glasses can be used as absorption filters for certain laser wavelengths. The need exists for filters with optical densities from 3.0 to as high as 8.0 at laser wavelengths. Glasses containing certain rare earths are ideal for these applications, maintaining a relatively high luminous transmission while having wavelength selective absorption. As the rare-earth content increases, deviation from Beers' Law is observed. This is assumed to be a result of the rare-earth ion bonding in new structural sites within the glass structure, and clustering of rare-earth ions as they try to satisfy their need for a high coordination polyhedra. Both structural arrangements lead to a different energy of splitting and a smearing of the absorption band. This can be used favorably to develop filters that absorb laser wavelengths sufficiently removed from the absorption peak wavelength of the rare-earth. Therefore, high rare-earth content glasses are useful if they can be fabricated in sufficiently large quantities. Herein a lowered liquidus is desirable.

TABLE II

A series of stable $Er_2O_3$ glasses showing the effect of $TiO_2$ on the linear absorption coefficient and optical density at 532 nm (compositions given in mol %).

| Oxide [mol %] | ER-08 | ER-B7 | ER-T1 | ER-T3 | ER-T4 | ER-T6 | ER-T8 | ER-T12 | ER-T17 |
|---|---|---|---|---|---|---|---|---|---|
| $SiO_2$ | 22.5 | 26.0 | 20.0 | 17.0 | 17.0 | 15.0 | 17.0 | 25.0 | 5.0 |
| $TiO_2$ | | | 10.0 | 15.0 | 17.0 | 19.0 | 19.0 | 15.0 | 20.0 |
| $B_2O_3$ | 22.5 | 26.0 | 27.0 | 25.0 | 25.0 | 25.0 | 23.0 | 15.0 | 15.0 |
| $Al_2O_3$ | 12.0 | 11.0 | 12.0 | 12.0 | 11.0 | 11.0 | 11.0 | 15.0 | 15.0 |
| $ZrO_2$ | 5.0 | 3.0 | 3.0 | 3.0 | 2.0 | 2.0 | 2.0 | 2.0 | 2.0 |
| $Y_2O_3$ | 8.0 | | | | | | | | |
| $Er_2O_3$ | 30.0 | 34.0 | 28.0 | 28.0 | 28.0 | 28.0 | 28.0 | 28.0 | 28.0 |
| $n_D$ (Calc.) | 1.916 | 1.850 | 1.828 | 1.891 | 1.888 | 1.901 | 1.902 | 1.877 | 1.911 |
| a(@532 nm) [/cm · mol % $Er_2O_3$] | 0.8861 | 0.9485 | 1.15505 | 1.2149 | 1.2824 | 1.3928 | 1.4519 | 1.4063 | 1.2823 |
| $t_{crit}$ [mm] (OD@532 nm = 5.0) | 4.25 | 3.51 | 3.52 | 3.32 | 3.15 | 2.90 | 2.78 | 2.87 | 3.15 |

| Oxide [mol %] | ER-T2 | ER-T5 | ER-T7 | ER-T36 | ER-T32 | ER-T48 | ER-T43 | ER-T11 | PE-A13 |
|---|---|---|---|---|---|---|---|---|---|
| $SiO_2$ | 18.0 | 17.0 | 16.0 | 25.0 | 25.0 | 23.0 | 22.0 | 18.0 | 70.0 ($P_2O_5$) |
| $TiO_2$ | 12.5 | 11.0 | 12.0 | 10.0 | 10.0 | 10.0 | 10.0 | 8.0 | |
| $B_2O_3$ | 25.0 | 25.0 | 25.0 | 25.0 | 25.0 | 25.0 | 22.0 | 23.0 | |
| $Al_2O_3$ | 12.0 | 12.0 | 11.0 | 6.0 | 6.0 ($AlCl_3$) | 6.0 ($AlF_3$) | 12.0 | 11.0 | 5.0 ($K_2O$) |
| $ZrO_2$ | 3.0 | 3.0 | 2.0 | | | | | 2.0 | 5.0 (ZnO) |
| $Er_2O_3$ | 29.5 | 32.0 | 34.0 | 34.0 | 34.0 | 34.0 | 34.0 | 38.0 | 20.0 |
| $n_D$ | 1.889 | 1.904 | 1.915 | 1.867 | 1.824 | 1.867 | 1.871 | 1.928 | 1.65 |
| a(@532 nm) [/cm · mol % $Er_2O_3$] | 1.1256 | 1.1814 | 1.2448 | 1.1915 | 1.0807 | 1.1404 | 1.2241 | 1.1859 | 0.598 |
| $t_{crit}$ [mm] (OD@532 nm = 5.0) | 3.40 | 2.99 | 2.67 | 2.79 | 3.08 | 2.92 | 2.72 | 2.51 | 9.51 |

Glasses based on the simplest embodiment, in the system $B_2O_3$—$TiO_2$—$Nd_2O_3$, are illustrated by several examples in Table I.

As is known, optical density, OD=$-Log_{10}\tau$,

Beers' Law; $\tau=(1-R)^2 \exp(-a c x)$, where $\tau$=transmittance,

Glass structures are inherently random, with a degree of randomness that is relatively small in meta-borates and meta-phosphate glasses, and relatively large in complex multi-component glasses. One of the outward manifestations of this is seen in the spectral absorption of the rare-earth ions. The higher the degree of order in the glass the more closely the spectral signature of the rare-earth ion approaches that of the free ion state, that is, narrow absorption bands. In the case of high optical density filters where the wavelength of concern is located at an energy slightly removed from the peak absorption band of the rare-earth ion, more glass randomness leads to more spectral smearing which increases the optical density at the desired wavelength. The selection of components that can be added to effect this positive change is somewhat limited to glass formers, conditional glass-formers and other components that help stabilize the glass. $SiO_2$ added to a rare-earth borate improves the stability. $Al_2O_3$ added to the rare-earth borosilicate will further improve the stability. Because we need to maintain a high concentration of rare-earth in the glass any additional component must replace $SiO_2$, $B_2O_3$, $Al_2O_3$, or some combination of these components, while improving the stability. Modifiers such as the alkali oxides and the alkali-earth oxides do not fit this criteria. The choices are limited to $P_2O_5$, $GeO_2$, $Ga_2O_3$, $ZnO$, $ZrO_2$, $SnO_2$, $Nb_2O_5$, $WO_3$, and $MoO_3$. Some components, such as $P_2O_5$, are limited to very low levels, as they promote phase separation in these glasses. Others, such as $WO_3$ and $MoO_3$ can react unfavorably to produce colored glasses. $SnO_2$ must be limited as it tends to promote phase separation, and $ZrO_2$ and $ZnO$ promote devitrification when added in moderate levels. $GeO_2$ can wholly replace $SiO_2$ in the glass, but is limited by its 5-fold higher cost relative to silica. Therefore, $TiO_2$, which suffers from none of these deficiencies, is unique in its role of improving stability and allowing higher concentration rare-earth glasses to be produced.

The last entry in Table II illustrates the case of a highly ordered chain-like erbium metaphosphate glass, which when comparing the linear absorption coefficient and critical thickness to the array of more random glasses preceding it in the table is shown to be radically different. Also the $Nd_2O_3$ glasses in Table III illustrate this point, with the last two columns being for a highly ordered metaborate glass and a highly random multi-component glass. The effect that this has on absorption at 532 nm is dramatic, as shown in the experimentally measured linear absorption coefficient and critical thickness.

$TiO_2$ added to a B—Si—Al—Ln glass of high rare-earth concentration will greatly enhance the deviation from Beers' Law, such that very high optical density filters can be formed at very practical filter thicknesses.

glasses are without $TiO_2$ and show typical values found for high $Er_2O_3$ concentration glasses. The addition of $TiO_2$ greatly increases the optical density at 532 nm, as the $^2H_{11/2}$ absorption band at approximately 522 nm is smeared out.

Table III illustrates the same point for high $Nd_2O_3$ glasses. A comparison of glass ND-A2 and ND-T3 is a striking example. ND-A2, without $TiO_2$, with 39 mol % $Nd_2O_3$, has a critical thickness of 1.91 mm for an optical density of 5.0 at 532 nm. In comparison, glass ND-T3, with 17 mol % $TiO_2$, and only 30 mol % $Nd_2O_3$, has a critical thickness of 1.65 mm for an optical density of 5.0 at 532 nm. This is an improvement since the critical thickness has been decreased and the melt stability greatly improved.

Also of note in Table 1 is the glass ND-T8 with 20 mol % $TiO_2$ and only 5 mol % $SiO_2$. This compositional extreme still produced a very stable glass which exhibits the largest linear absorption coefficient in this series. A typical lens thickness of 2.0 mm and an optical density of 5.0 would require, in the case of glass ND-T8, a $Nd_2O_3$ concentration of 24.2 mol %, if Beers' Law were strictly obeyed.

Table IV qualitatively examines the role of $TiO_2$ on the glass stability of ultra-concentrated $Er_2O_3$ glasses. Table IV shows clearly that $TiO_2$ greatly improves the glass stability at high rare-earth concentration.

TABLE IV

The role of $TiO_2$ on the glass stability of ultra-concentrated $Er_2O_3$ glasses.

| Oxide [mol %] | ER-D11 | ER-T9 | ER-D7,8 | ER-T13 | 6 MELTS | 3 MELTS | 5 MELTS |
|---|---|---|---|---|---|---|---|
| $SiO_2$ | 25.0 | 16.0 | 28.0 | 20.0 | 21–26.0 | 18–20.0 | 16–24.0 |
| $TiO_2$ |  | 12.0 |  | 8.0 |  | 8.0 | 6–12.0 |
| $B_2O_3$ | 23.0 | 23.0 | 20.0 | 20.0 | 22–25.0 | 20–24.0 | 23–24.0 |
| $Al_2O_3$ | 11.0 | 11.0 | 11–13.0 | 12.0 | 11–16.0 | 10–12.0 | 8–11.0 |
| $ZrO_2$ | 5.0 | 2.0 | 3–5.0 | 2. | 1–4.0 | 0.–2.0 | 0–4.0 |
| $Er_2O_3$ | 36.0 | 36.0 | 36.0 | 38.0 | 37.0 | 38.0 | 36.0 |
| STATE | X-TAL | GLASS | XTAL | GLASS | XTAL | GLASS | GLASS |

In Table V a comparison is made of glass stability at more modest $Er_2O_3$ concentrations. Table V illustrates that for certain glass compositions, devoid of $TiO_2$ and low in $B_2O_3$,

TABLE III

A series of stable $Nd_2O_3$ glasses showing the effect of $TiO_2$ on the linear absorption coefficient and optical density at 532 nm.

| Oxide [mol %] | ND-A2 | ND-S01 | ND-T1 | ND-T2 | ND-T3 | ND-T4 | ND-T5 | ND-T8 | ND-T9 | ND-T10 | ND-T33 | ND-T35 |
|---|---|---|---|---|---|---|---|---|---|---|---|---|
| $SiO_2$ | 24.8 | 25.0 | 25.0 | 25.0 | 25.0 | 20.0 | 15.0 | 5.0 |  |  |  | 15.0 |
| $TiO_2$ |  |  | 13.0 | 15.0 | 17.0 | 13.0 | 13.0 | 20.0 | 15.0 | 15.0 | 25.0 | 15.0 |
| $GeO_2$ |  |  |  |  |  |  |  |  |  |  |  | 5.0 |
| $B_2O_3$ | 24.8 | 25.0 | 15.0 | 13.0 | 11.0 | 20.0 | 25.0 | 30.0 | 35.0 | 30.0 | 50.0 | 20.0 |
| $Al_2O_3$ | 9.5 | 20.0 | 15.0 | 15.0 | 15.0 | 15.0 | 15.0 | 15.0 | 20.0 | 25.0 |  | 5.0 |
| $Ga_2O_3$ |  |  |  |  |  |  |  |  |  |  |  | 2.5 |
| $ZrO_2$ | 1.9 |  | 2.0 | 2.0 | 2.0 | 2.0 | 2.0 |  |  |  |  | 2.5 |
| $Y_2O_3$ |  |  |  |  |  |  |  |  |  |  |  | 2.5 |
| $Nb_2O_5$ |  |  |  |  |  |  |  |  |  |  |  | 2.5 |
| $Nd_2O_3$ | 39.0 | 30.0 | 30.0 | 30.0 | 30.0 | 30.0 | 30.0 | 30.0 | 30.0 | 30.0 | 25.0 | 30.0 |
| $n_D$ (Calc.) | 1.913 | 1.793 | 1.846 | 1.848 | 1.862 | 1.858 | 1.858 | 1.893 | 1.863 | 1.860 | 1.894 | 1.850 |
| a(@532 nm) [/cm · mol % $Nd_2O_3$] | 1.5180 | 1.7301 | 2.1800 | 2.2334 | 2.2867 | 2.0978 | 2.1288 | 2.3389 | 2.0419 | 2.1852 | 2.1225 | 2.5870 |
| $t_{crit}$ [mm] (OD@532 nm = 5.0) | 1.91 | 2.18 | 1.73 | 1.69 | 1.65 | 1.80 | 1.77 | 1.61 | 1.85 | 1.73 | 2.13 | 1.46 |

Table II shows this effect of $TiO_2$ addition in a series of high $Er_2O_3$ concentration glasses, where the linear absorption coefficient at 532 nm, defined as (1/cm·mol %$Er_2O_3$), and the critical thickness, $t_{crit}$, for an absorptive filter at 532 nm with an optical density of 5.0 are compared. The first two glass stability is poor. Glasses of similar $Er_2O_3$ concentration, and similar levels of $B_2O_3$, but containing $TiO_2$ form very stable glasses, suggesting that the region of stable glass formation is extended.

TABLE V

The role of TiO$_2$ on the glass stability of 28-34 mol % Er$_2$O$_3$ glasses.

| Oxide [mol %] | ER-A3,5,6 | ER-T12 | 10 MELTS | 8 MELTS | 34 MELTS |
|---|---|---|---|---|---|
| SiO$_2$ | 26.0 | 25.0 | 5-30.0 | 10-40.0 | 0-28.0 |
| TiO$_2$ | | 15.0 | 10-20.0 | 8-20.0 | 8-16.0 |
| B$_2$O$_3$ | 11-21.0 | 15.0 | 10-30.0 | 0-30.0 | 10-28.0 |
| Al$_2$O$_3$ | 15-30.0 | 15.0 | 11-20.0 | 0-20.0 | 0-15.0 |
| ZrO$_2$ | 5-10.0 | 2.0 | 0-7.0 | 0-5.0 | 0-4.0 |
| Er$_2$O$_3$ | 28.0 | 28.0 | 28.0 | 30.0 | 34.0 |
| STATE | XTAL | GLASS | GLASS | GLASS | GLASS |

The liquidus temperature is compared for a series of Er$_2$O$_3$ glasses in Table VI for 34 mol % Er$_2$O$_3$ glasses and for glasses containing 32-34 mol % Er$_2$O$_3$ in Table VII.

increase the index of refraction quite rapidly. But, due to the lanthanide contraction, the lower mass, lower field-strength ions at the beginning of the lanthanide series make a larger contribution to the index of refraction that do the higher mass, higher field-strength ions at the end of the lanthanide series. The addition of titanium also greatly increases the index of refraction. Therefore glasses based on high rare-earth concentration and high titanium concentration possess indexes greater than 1.9 and in some instances greater than 2.0. Fabrication is facilitated with a low melt liquidus temperature, which can be realized by having a mixture of rare-earth ions of differing field strength, such as La$^{3+}$, Gd$^{3+}$ and Yb$^{3+}$. Additionally, basing these glasses predominately on B$_2$O$_3$ creates a glass of low dispersion. Examples of non-absorbing optical filter glasses are given in Table VIII.

TABLE VI

The liquidus temperature of a series of 34 mol % Er$_2$O$_3$ glasses.

| Oxide [mol %] | ER-T23 | ER-T24 | ER-T25 | ER-T26 | ER-T27 | ER-T28 | ER-T29 |
|---|---|---|---|---|---|---|---|
| SiO$_2$ | 21.25 | 23.00 | 24.00 | 25.00 | 26.00 | 27.00 | 28.00 |
| TiO$_2$ | 10.00 | 10.00 | 10.00 | 10.0 | 10.00 | 10.00 | 10.00 |
| B$_2$O$_3$ | 21.25 | 23.00 | 24.00 | 25.00 | 26.00 | 27.00 | 28.00 |
| Al$_2$O$_3$ | 10.00 | 7.40 | 5.90 | 4.44 | 2.96 | 1.48 | 0 |
| ZrO$_2$ | 3.50 | 2.60 | 2.10 | 1.56 | 1.04 | 0.52 | 0 |
| Er$_2$O$_3$ | 34.00 | 34.00 | 34.00 | 34.00 | 34.00 | 34.00 | 34.00 |
| Tl [°C.] | 1400. | 1345. | 1345. | 1320. | 1295. | 1285. | 1295. |

| Oxide [mol %] | ER-T96 | ER-T98 | ER-T100 | ER-T102 | ER-T103 | ER-T87 | ER-T88 | ER-T86 | ER-T84 |
|---|---|---|---|---|---|---|---|---|---|
| SiO$_2$ | 23.00 | 23.00 | 23.00 | 23.00 | 23.00 | 23.00 | 23.00 | 23.00 | 23.00 |
| TiO$_2$ | 8.00 | 8.00 | 7.00 | 7.00 | 10.00 | 8.00 | 8.00 | 8.00 | 8.00 |
| B$_2$O$_3$ | 23.00 | 23.00 | 23.00 | 23.00 | 23.00 | 23.00 | 23.00 | 23.00 | 23.00 |
| Al$_2$O$_3$ | 10.00 | 8.00 | 7.00 | 7.00 | 10.00 | 10.00 | 8.00 | 10.00 | 10.00 |
| ZrO$_2$ | 2.00 | 4.00 | 6.00 | 7.00 | 0 | 0 | 0 | 0 | 0 |
| MgO | 0 | 0 | 0 | 0 | 0 | 2.00 | 2.00 | 0 | 0 |
| ZnO | 0 | 0 | 0 | 0 | 0 | 0 | 2.00 | 0 | 2.00 |
| WO$_3$ | 0 | 0 | 0 | 0 | 0 | 0 | 0 | 2.00 | 0 |
| Er$_2$O$_3$ | 34.00 | 34.00 | 34.00 | 34.00 | 34.00 | 34.00 | 34.00 | 34.00 | 34.00 |
| Tl [°C.] | 1335. | 1345. | 1365. | 1380. | 1295. | 1370. | 1370. | 1325. | 1370. |

TABLE VII

The liquidus temperature of a series of 32-34 mol % Er$_2$O$_3$ glasses.

| Oxide [mol %] | ER-T36 | ER-T109 | ER-T110 | ER-T111 | ER-T112 | ER-T113 | ER-T114 | ER-T115 | ER-T116 |
|---|---|---|---|---|---|---|---|---|---|
| SiO$_2$ | 25.00 | 26.00 | 29.00 | 24.00 | 29.00 | 25.50 | 22.00 | 20.00 | 20.00 |
| TiO$_2$ | 10.00 | 10.00 | 10.00 | 10.0 | 10.00 | 10.00 | 12.00 | 14.00 | 13.00 |
| B$_2$O$_3$ | 25.00 | 20.00 | 17.00 | 24.00 | 29.00 | 25.50 | 22.00 | 20.00 | 20.00 |
| Al$_2$O$_3$ | 6.00 | 10.00 | 10.00 | 10.00 | 0 | 5.00 | 12.00 | 14.00 | 13.00 |
| Er$_2$O$_3$ | 34.00 | 34.00 | 34.00 | 32.00 | 32.00 | 34.00 | 32.00 | 32.00 | 34.00 |
| Tl [°C.] | 1320. | 1340. | 1370. | 1285. | 1310. | 1325. | 1275. | 1295. | 1325. |

For a given rare-earth ion, glass-based Faraday rotator elements show a linear relationship between rare-earth concentration and the Verdet constant. High Verdet constant glasses then require high rare-earth concentrations. To achieve this the glass again must be stable against devitrification. Tb$_2$O$_3$, which exhibits the strongest Faraday effect of any rare-earth ions, can be substituted for other rare-earth ions in the previously outlined rare-earth glasses of high concentration and stability.

Glasses with high index of refraction are useful in many optical elements. Rare-earth ions, because of their mass,

TABLE VIII

Compositions of stable optical glasses based on a mixture of rare-earth ions.

| Oxide [mol %] | LN-T6 | LN-T4 | LN-T5 | LN-T1 | LN-T2 | LN-T3 | LN-T6 |
|---|---|---|---|---|---|---|---|
| SiO$_2$ | 30.0 | 20.0 | 20.0 | 24.0 | 23.25 | 23.0 | 21.0 |
| TiO$_2$ | 20.0 | 17.5 | 15.0 | 8.0 | 7.75 | 7.0 | 7.0 |

TABLE VIII-continued

Compositions of stable optical glasses based on a mixture of rare-earth ions.

| Oxide [mol %] | LN-T6 | LN-T4 | LN-T5 | LN-T1 | LN-T2 | LN-T3 | LN-T6 |
|---|---|---|---|---|---|---|---|
| $B_2O_3$ | 30.0 | 20.0 | 20.0 | 24.0 | 23.25 | 23.0 | 23.0 |
| $Al_2O_3$ |  | 12.5 | 15.0 | 8.0 | 7.75 | 7.0 | 7.0 |
| $Y_2O_3$ | 5.0 | 10.0 | 7.5 | 9.0 | 9.50 | 10.0 | 10.5 |
| $La_2O_3$ | 5.0 | 10.0 | 7.5 | 9.0 | 9.50 | 10.0 | 10.5 |
| $Gd_2O_3$ | 5.0 |  | 7.5 | 9.0 | 9.50 | 10.0 | 10.5 |
| $Yb_2O_3$ | 5.0 | 10.0 | 7.5 | 9.0 | 9.50 | 10.0 | 10.5 |
| Total $Ln_2O_3$ | 20.0 | 30.0 | 35.0 | 36.0 | 38.0 | 40.0 | 42.0 |
| STATE | glass | glass | glass | glass | glass | glass | glass |

While embodiments and applications of this invention have been shown and described, it would be apparent to those skilled in the art that many more modifications are possible without departing greatly from the spirit of this invention described herein. Furthermore this glass may be applicable to optical elements wherein no absorption is desired, for instance as Faraday rotator glass or novel glasses with unique $n_D$-v (index-dispersion) properties, though not specifically stated in the appended claims.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An optical glass consisting essentially of, in mole percent, 0–40% $SiO_2$, 5–30% $TiO_2$, 10–60% $B_2O_3$, 0–30% $Al_2O_3$, 0–25% $GeO_2$, 0–25% $Y_2O_3$, 0–10% $ZrO_2$, 0–20% $Ga_2O_3$, 0–10% $WO_3$, 0–9% $MoO_3$, 0–8% ZnO, 0–7% $SnO_2$ 0–5% $Ta_2O_5$, and 20–42% $Ln_2O_3$, where the rare-earth oxide, $Ln_2O_3$ is one or more selected from the following group: $Er_2O_3$, $Nd_2O_3$, $Dy_2O_3$, $Sm_2O_3$, $Ho_2O_3$, $La_2O_3$, $Gd_2O_3$, $Yb_2O_3$, $Tb_2O_3$, $Eu_2O_3$, $Tm_2O_3$, $Pr_2O_3$, $Ce_2O_3$; and with the compositional limits, in mole percent, further defined by the following equalities; $SiO_2+B_2O_3+GeO_2+P_2O_5 \geq +\%$, $Ln_2O_3+Y_{2O}$ 20–42%, $TiO_2+A_2O_3+ZrO_2+ZnO+SnO_2+Ga_2O_3+Nb_2O_5 \leq Ta_2O_5+WO_3+MoO_3=10$–37%, $TiO_2+Al_2O_3=10$–36%, $TiO_2+SiO_2$ (with $GeO_2=0$) =15–75%, $TiO_2+SiO_2+GeO_2=29$–60%, and $TiO_2+SiO_2+GeO_2+B_2O_3=48$–80%.

2. An optical glass of claim 1 wherein the rare-earth oxide is $Er_2O_3$ and the glass absorbs strongly at laser wavelengths of 488 nm, 527.9 nm and 532 nm, such that the optical density at these wavelengths is greater than 6.0 at a glass thickness less than 3.0 mm.

3. An optical glass of claim 1 wherein the rare-earth oxide is $Er_2O_3$ and the glass absorbs strongly at laser wavelengths of 488 nm, 527.9 nm and 532 nm, such that the optical density at these wavelengths is greater than 5.0 at a glass thickness less than 3.5 mm.

4. An optical glass of claim 1 wherein the rare-earth oxide is $Er_2O_3$ and the glass absorbs strongly at laser wavelengths of 488 nm, 527.9 nm and 532 nm, such that the optical density at these wavelengths is greater than 4.0 at a glass thickness less than 4.0 mm.

5. An optical glass of claim 1 wherein the rare-earth oxide is $Nd_2O_3$ and the glass absorbs strongly at laser wavelengths of 514.5 nm, 527.9 nm, 532 nm, 580–600 nm and 755 nm, such that the optical density at these wavelengths is greater than 6.0 at a glass thickness less than 2.0 mm.

6. An optical glass of claim 1 wherein the rare-earth oxide is $Nd_2O_3$ and the glass absorbs strongly at laser wavelengths of 514.5 nm, 527.9 nm, 532 nm, 580–600 nm and 755 nm, such that the optical density at these wavelengths is greater than 5.0 at a glass thickness less than 2.5nm.

7. An optical glass of claim 1 wherein the rare-earth oxide is $Nd_2O_3$ and the glass absorbs strongly at laser wavelengths of 514.5 nm, 527.9 nm, 532 nm, 580–600 nm and 755 nm, such that the optical density at these wavelengths is greater than 4.0 at a glass thickness less than 3.0 mm.

8. An optical glass of claim 1 wherein the rare-earth oxide is a combination of $Dy_2O_3$ and $Nd_2O_3$ and the glass absorbs strongly at the $Nd_{3+}$:YAG wavelength of 1064 nm and the frequency doubled $Nd_{3+}$:YAG wavelength of 532 nm, such that the optical density at these wavelengths is greater than 3.0 at a glass thickness less than 3.0 mm.

9. An optical glass of claim 1 wherein the rare-earth oxide is a combination of $Dy_2O_3$ and $Nd_2O_3$ and the glass absorbs strongly at the $Nd_{3+}$:YAG wavelength of 1064 nm and the frequency doubled $Nd_3$+:YAG wavelength of 532 nm, such that the optical density at these wavelengths is greater than 3.0 at a glass thickness less than 4.0 mm.

10. An optical glass of claim 1 wherein the rare-earth oxide is a combination of $Dy_2O_3$ and $Nd_2O_3$ and the glass absorbs strongly at the $Nd_{3+}$:YAG wavelength of 1064 nm and the frequency doubled $Nd_3$+:YAG wavelength of 532 nm, such that the optical density at 1064 nm is greater than 1.0 and the optical density at 532 nm is greater than 6.0 at a filter thickness less than 2.0 mm.

11. An optical glass of claim 1 wherein the rare-earth oxide is a combination of $Dy_2O_3$ and $Nd_2O_3$ and the glass absorbs strongly at the $Nd_{3+}$:YAG wavelength of 1064 nm and the frequency doubled $Nd_{3+}$:YAG wavelength of 532 nm, such that the optical density at 1064 nm is greater than 1.0 and the optical density at 532 nm is greater than 6.0 at a glass thickness less than 3.0 mm.

12. A borate glass consisting essentially of, in mole percent, 10–60% $B_2O_3$, 10–30% $TiO_2$, and 15–35% $Ln_2O_3$, where the rare-earth oxide, $Ln_2O_3$ is one or more selected from the following group: $Er_2O_3$, $Nd_2O_3$, $Dy_2O_3$, $Sm_2O_3$, $Ho_2O_3$, $La_2O_3$, $Gd_2O_3$, $Yb_2O_3$, $Tb_2O_3$, $EU_2O_3$, $Tm_2O_3$, $Pr_2O_3$, $Ce_2O_3$.

13. A glass of claim 12 which further comprises: 0–40% $SiO_2$, 0–30% $Al_2O_3$, 0–25% $GeO_2$, 0–25% $Y_2O_3$, 0–10% $P_2O_5$ 10–10% $ZrO_2$, 0–20% $Ga_2O_3$, 0–10% $WO_3$, 0–9% $MoO_3$, 0–8% ZnO, 0–7% $SnO_2$, 0–6% $Nb_2O_5$, 0–5% $Ta_2O_5$.

14. A glass as in claim 13 with the compositional limits, in mole percent, further defined by the following equalities: $SiO_2+B_2O_3+GeO_2+P_2O_5 2$ 30%, $Ln_2O_3+Y_2O_3=20$–42%, $TiO_2+Al$ $SnO_2+Ga_2O_3$ $+Nb_{25}+Ta_2O_5+WO_3+MOo_3=10$–37%, $=10$–36%, $TiO_2+SiO_2$ (with $GeO_2=0$) =15–55%, $TiO_2+Si$ 29–60%, and $TiO_2+SiC_2+GeO_2+B_2O_3=48$–80%.

* * * * *

UNITED STATES PATENT AND TRADEMARK OFFICE
CERTIFICATE OF CORRECTION

PATENT NO. : 5,747,397
DATED : May 5, 1998
INVENTOR(S) : McPherson et al.

It is certified that error appears in the above-identified patent and that said Letters Patent is hereby corrected as shown below:

In column 10 at lines 21, 22, 27, 28, 33, 34, 40, and 41; corresponding to Claims 8, 9, 10, and 11; please replace the phrase "$Nd_{3+}$" with --$Nd^{3+}$--.

Signed and Sealed this

Twenty-seventh Day of July, 1999

Attest:

Q. TODD DICKINSON

*Attesting Officer*   *Acting Commissioner of Patents and Trademarks*